Oct. 30, 1962 T. W. MARTINEK 3,061,544
METHOD FOR PREPARING COLLOIDAL DISPERSIONS
Original Filed Oct. 6, 1954 2 Sheets-Sheet 1

INVENTOR.
THOMAS W. MARTINEK
BY
ATTORNEY

Oct. 30, 1962 T. W. MARTINEK 3,061,544
METHOD FOR PREPARING COLLOIDAL DISPERSIONS
Original Filed Oct. 6, 1954 2 Sheets-Sheet 2

INVENTOR.
THOMAS W. MARTINEK
BY
ATTORNEY

United States Patent Office 3,061,544
Patented Oct. 30, 1962

3,061,544
METHOD FOR PREPARING COLLOIDAL
DISPERSIONS
Thomas W. Martinek, Crystal Lake, Ill., assignor to The Pure Oil Company, Chicago, Ill., a corporation of Ohio
Original application Oct. 6, 1954, Ser. No. 460,653, now Patent No. 2,905,448, dated Sept. 22, 1959. Divided and this application Aug. 29, 1958, Ser. No. 758,013
11 Claims. (Cl. 252—32)

The invention relates to a method for preparing colloidal dispersions, exemplified by lubricating grease compositions in which the method is characterized by simultaneous lowering of the temperature, pressure, and concentration during shearing and working in a single zone.

According to the prior art it is conventional to pulverize solids, as, mineral material, by providing two or more currents or streams of a liquid which are discharged under high pressure past an orifice conveying the solids into contact with the streams. Devices are in existence wherein a solid is conveyed through a venturi-type arrangement and through rotational means wherein it picks up a liquid or impinges upon a liquid stream rotating in the opposite direction. Converging high-pressure jets are used to disperse particles of liquid or solids by impingement on a target which may be rotating. Various closely spaced orifices between rotors and stators are used to crush or disperse particles in gaseous or liquid media. In the grease-making art, it is conventional to heat a preformed soap or gel and an organic liquid carrier, as, a mineral lubricating oil, while mixing or working the mixture. The resulting grease is allowed to cool statically until the proper gel structure is formed and then the gel is subjected to milling, diluting, or homogenization processes to form the finished product. In all of these applications wherein a solid is comminuted by itself or in a gaseous or liquid medium it is not always possible to regulate the nature or extent of comminution or dispersion attained by controlling all of the phase changes simultaneously and the advantages of one type of operation, for example, the use of a high-pressure jet, are unrelated to the attainment of closely controlled dispersion. Prior art methods do not provide simple, inexpensive, flexible, and readily adaptable techniques for continuous production of dispersions. In the "Votator" method of grease making, a continuous stream of all the ingredients is passed through a high-temperature heat exchanger to effect the formation or solution or both of the solid phase in the liquid phase through elevation of temperature. The resulting solution is then cooled at predetermined rates to effect a colloidal dispersion of the solid phase at a lower temperature. These operations are followed by homogenization to effect greater dispersion of the solid phase. Excessive amounts of heat and rigid control of the processing conditions are necessary in these prior art processes and there is little flexibility in technique. In some instances, it is desirable to form dispersions which are very difficult, or even impossible, to stabilize with existing equipment. The present invention is directed to a method designed to overcome these and related shortcomings of the prior art.

Accordingly, a primary object of this invention is to provide a method for preparing emulsoidal dispersions and emulsions of a solid phase or phases in one or more liquid phases.

A second object of the invention is to provide a process for preparing emulsions or emulsoidal dispersions wherein simultaneous lowering of temperature, pressure, and concentration during working is accomplished.

A third object of the invention is to provide a method wherein a liquid phase is contacted at high velocity with a solid phase under simultaneous cooling, pressure lowering, and concentration change during extreme shearing or working.

Other objects and advantages of the invention will be apparent from the following description.

Although the invention relates to the preparation of dispersions of a solid phase in a liquid phase generally, it will be described in relation to grease manufacture as an illustrative process. Greases represent a particularly sensitive type of dispersion or gel structure and the state of aggregation of the gel has a very marked effect on the physical properties of the grease as related to water resistance, resistance to bleeding, dropping point, and the like.

For a better understanding of the invention, reference is made to the accompanying drawings, wherein.

In accordance with the invention, the preparation of dispersions or greases is facilitated by dissolving the colloid-forming or solid phase in a minimum amount of the colloid-bearing or liquid phase by applying sufficient heat to produce a solution which is called the hot, concentrated solution. This hot, concentrated solution is injected under high pressure through jet or spray nozzles into a zone of lower pressure and lower temperature where the jets or sprays meet or impinge against the balance of the liquid phase, also injected under high pressure. The effect of this rapid temperature-drop, rapid pressure-drop on the hot, concentrated solution with simultaneous concentration change, and the combined high velocity, thin-stream or spray injection into a rapidly moving, comparatively cool, liquid phase creates an extremely fine colloidal dispersion of the solid phase in the liquid phase. Complete and accurate control of temperature, pressure, and concentration is maintained on both the hot, concentrated solution and the balance of the liquid phase.

In order to better understand the invention, reference will first be made to the general flow diagram of the process which will be illustrated by its application to the manufacture of lubricating greases. Following this, specific embodiments and structures of the apparatus will be described.

Figure 1:
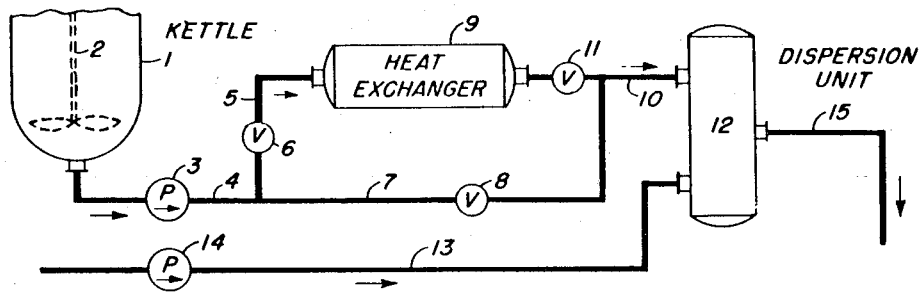
FIGURE 1 is a general flow diagram illustrating the relationship of auxiliary apparatus used to carry out the invention in the preparation of emulsoidal dispersions and emulsions using the specifically designed dispersion means to be described in detail in the subsequent figures.

Referring to FIGURE 1, about one-third of the total lubricating oil is charged to kettle 1 along with the soap stocks. Kettle 1 may comprise a standard Dopp kettle equipped with an agitator 2 and suitable heating means (not shown) in order to raise the temperature of the concentrate to about 175° to 185° F., preferably about 180° F. At this point a water solution of a metal base, as lithium hydroxide, is added with agitation. The temperature is raised to 275° F. to 285° F., preferably about 280° F., as the hot concentrate loses water. When dehydration is substantially complete, any oxidation inhibitors or other addends intended to be incorporated in the grease are added and uniformly dispersed. Next, the batch is pumped through line 4 by variable-speed, positive-displacement pump 3 into line 5 controlled by valve 6 (by-pass line 7 controlled by valve 8 being closed), and thence into heat exchanger 9 wherein the temperature is brought to about 380° F.

From heat exchanger 9 the hot solution passes through line 10 controlled by valve 11 into dispersion unit 12.

The details of the different embodiments of dispersion unit 12 will be explained in connection with FIGURES 2, 3, and 4. As the hot, concentrated solution passes through the dispersion area of unit 12, the balance of the remaining, comparatively cold oil (about ⅔ of the total oil) is being pumped into line 13 by another variable-speed, positive-displacement pump 14. Back-pressures of approximately 400 and 500 p.s.i.g. are maintained on inlet lines 10 and 13 respectively. The pumping rates of the two pumps are adjusted to give the proper ratio of hot solution to cool diluting oil. The final product leaves the dispersion unit 12 via dispersion unit outlet 15 for immediate packaging.

Figure 2:
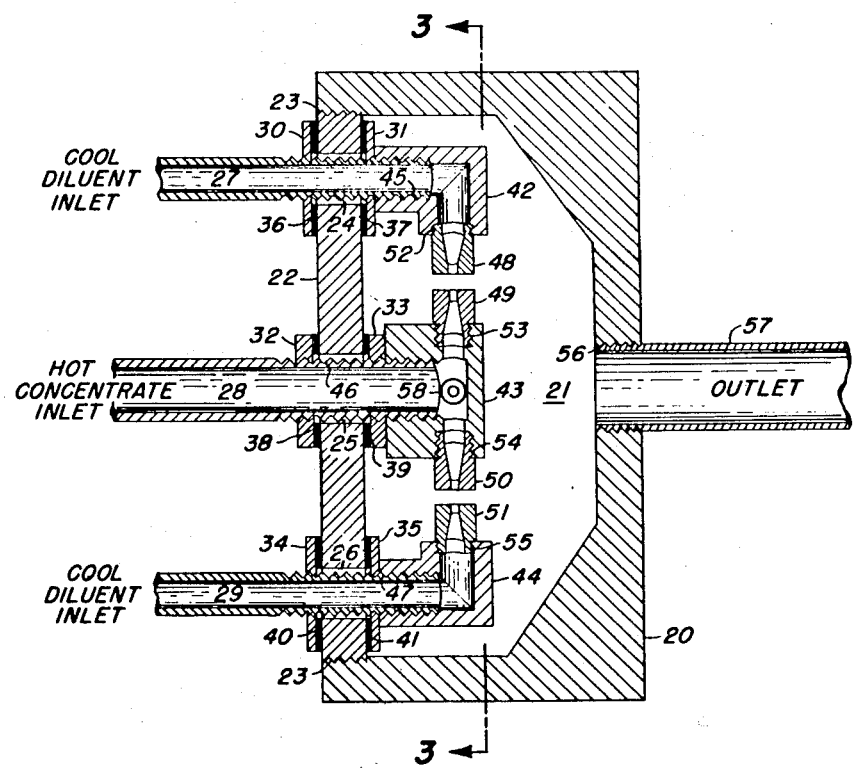
FIGURE 2 is a cross-sectional view of one form of dispersion head assembly.

Referring now to FIGURE 2, one arrangement of dispersion unit is shown in cross-section wherein housing 20 forms an enclosure or dispersion area 21 and receives plate 22 by threaded engagement as at 23. Plate 22 has a plurality of openings, 24, 25 and 26 through which pass conduits 27, 28 and 29, respectively. Conduits 27, 28 and 29 are threaded on their outer surfaces to receive lock nuts 30 and 31 (at the top) 32, 33 (intermediate) 34 and 35 (bottom) which draw against gaskets 36, 37 (top) 38, 39 (intermediate) 40 and 41 (bottom) to form a liquid-tight seal around the conduits adjacent to the openings. The threaded end of each conduit within the dispersion area 21 of housing 20 protrudes sufficiently to receive opposing outer jet nozzles 42, 43 and 44 in threaded engagement as shown at 45, 46 and 47. Jet nozzles 42, 43 and 44 are fitted with constricted tips 48, 49, 50 and 51 which are threaded within the jet nozzles as indicated at 52, 53, 54 and 55. Housing 20 has an aperture 56 into which is fixed exit line 57 to convey the finished dispersion to immediate packaging.

Conduits 27 and 29 preferably convey the cool diluting oil, and conduit 28 conveys the hot concentrate. Thus, referring to FIGURE 1, conduits 27 and 29 would be connected to line 13 of FIGURE 1 and conduit 28 would communicate with line 10 of FIGURE 1 in connecting the dispersion unit shown in FIGURE 2 therewith. Jet nozzle tips 48 and 49 have their openings directly opposite each other so that their respective discharge streams meet head-on for maximum dispersion. The same is true of tips 50 and 51. Aperture 58 in nozzle 43 leads to a third tip, not shown in FIGURE 2. A fourth tip connected to an aperture similar to aperture 58 is also provided as shown in FIGURE 3.

Figure 3:
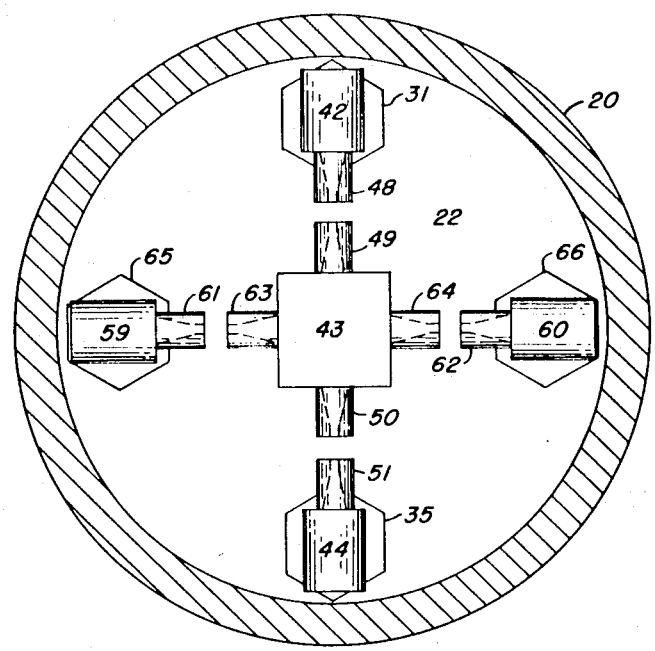
FIGURE 3 is a sectional view taken along lines 3—3 of FIGURE 2.

FIGURE 3 is a sectional view taken along lines 3—3 of FIGURE 2 showing the relative position of the outer jet nozzles 42 and 44 with center bank of nozzles 43. In this view are also shown additional outer jet nozzles 59 and 60 with corresponding tips 61 and 62 in opposed position to additional center bank nozzles 63 and 64 leading from center bank nozzle 43. Outer jet nozzles not shown in FIGURE 2 are here similarly constructed and fixed within plate 22 as with lock nuts 65 and 66. It is seen in FIGURE 3 that the hot concentrate emanating from nozzle 43 in four directions is met with cold diluent as a surrounding deluge.

Figure 4:
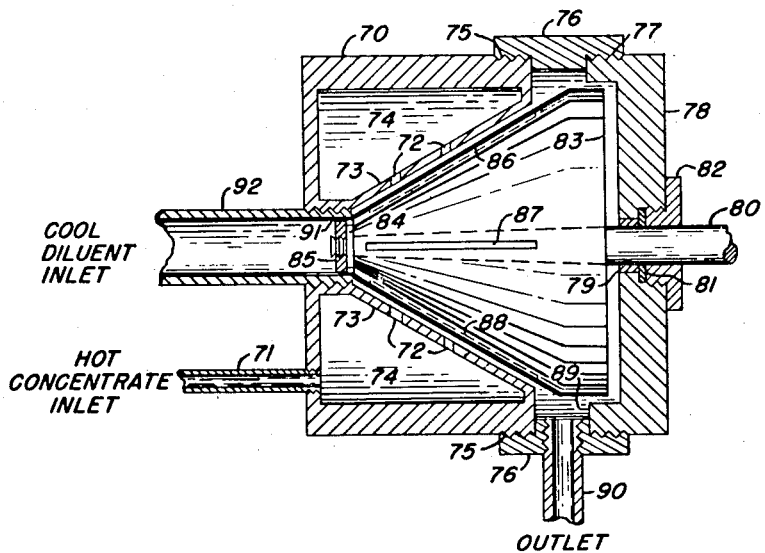
FIGURE 4 is a partial cross-sectional view of another form of dispersion head assembly.

Referring to FIGURE 4, still another form of dispersion unit is shown in partial cross-section. This form of dispersion unit is a modified colloid mill of the Charlotte type. Case hollow-body or stator 70, has inlet conduit 71 fitting thereto and a plurality of ports or slots 72 passing through its conical-shaped, internal wall 73. The internal space 74 of stator 70 conveys the concentrate phase from conduit 71 and forces the concentrate phase under high pressure through ports 72. Ports 72 are preferably located near the apex of conical internal wall 73. The external peripheral edge of stator 70 is threaded as at 75 to receive ring 76 which has internal thread 77 to engage support ring 78. Ring 78 carries bearing 79 and shaft 80. A liquid seal around bearing 79 is provided by gasket 81 held in place by lock nut 82. Shaft 80 carries conical rotor 83 held upon the shaft by washer 84 and lock nut 85 engaging the threaded portion of the shaft end. Rotor 83 is keyed or otherwise affixed to shaft 80 so that rotation of the shaft by a power source (not shown) causes rotation of the rotor. The conical outer surface of rotor 83 is parallel to and spaced from the external conical surface of wall 73 of stator 70 by a distance of about 2 to 50 thousands of an inch. This clearance is made adjustable by displacement of shaft 80 towards or away from stator 70. The rotating speeds used will vary from about 3600 to 7200 r.p.m.

Depending upon the physical and/or chemical properties of the dispersant and dispersed phase, ports 72 may vary in size from about 0.025 to 0.005 inch. The relative size of the ports is a function of the pressure and velocity, and the viscosity of the dispersed phase. The outer face of rotor 83 presents a machined surface except for spaced, conically arranged grooves shown at 86, 87 and 88. The grooves are equally spaced and concentrically arranged around the periphery of rotor 83 and in the embodiment shown in FIGURE 4, four grooves are present. It is understood that any number of grooves may be used on rotor 83.

Ring 76 has port 89 into which conduit 90 is attached. The center portion of stator 70 has threaded inlet 91 which surrounds and is spaced from lock nut 85. Conduit 92 attaches to inlet 91 by threaded engagement.

In order to illustrate the invention which is broadly applicable to the preparation of dispersions of a solid phase and a liquid phase, the manufacture of a lithium base grease will be used as an example. To illustrate a grease composition, the following formulation is prepared: Lithium soaps of 60% hydrogenated castor oil-40% hydrogenated tallow, 4.5% by weight; 550 vis. hydrocarbon oil 95%; and oxidation inhibitor 0.5%.

This grease composition is processed as follows: A hot concentrate is prepared by forming the soaps at a concentration of 11.25 percent by weight, in approximately ⅓ of the total oil to be used, by the addition of the mixture of hydrogenated castor oil and hydrogenated tallow to the hydrocarbon oil followed by the addition of a lithium base such as lithium oxide or lithium hydroxide. This mixture is dehydrated at a temperature of about 280° F. The hot concentrate is prepared in soap kettle 1 (FIGURE 1) and pumped through lines 4 and 5 to high-temperature heat exchanger (9) where the soaps are brought into solution at approximately 380° F. The resulting hot soap solution is then ready for ejection into dispersion unit 12 via line 10. A back-pressure of approximately 400 to 500 p.s.i.g. is maintained on line 10. If unit 12 takes the form shown in FIGURE 2, the hot concentrate passes through conduit 28 into nozzle 43 and out the plurality of jets 49, 50 and 63 and 64 (FIGURE 3). The remaining oil (⅔ of the total) is passed at about 500–1000 p.s.i.g. or more through line 13 into dispersion unit 12, or referring to FIGURE 2, through conduits 27 and 29 into nozzles 42 and 44 and jets 48 and 51. In the dispersion unit shown in FIGURE 2, the streams of hot concentrate from conduit 28 and diluting oil from conduit 27 are jetted against each other in opposing streams by the proximity and alignment of the openings therein. These streams are ejected at high velocities of about 1000 to 4000 feet per second. The resultant grease which attains a temperature of 200° F. passes through conduit 57 for immediate packaging.

The grease exhibits an ASTM worked penetration of about 320 and shows practically no change upon further working. The dropping point of the grease is about 365° F.

The manufacture of a polyethylene grease comprises another process to which the apparatus and technique of the present invention is applicable. Such a grease comprises about 5 percent by weight of polyethylene, molecular weight 20,000, dispersed in 95 percent by weight of neutral mineral oil having a viscosity of about 200 SUS at 100° F. Referring to FIGURE 1, about one-half of the neutral oil is charged to kettle 1 and heat and agitation applied. The polyethylene is next added to form a slurry which becomes a solution at 200–250° F., depending on the rate of heat application. The solution is pumped through line 7 (by-passing heat exchanger 9) into line 10 and dispersion unit 12 with valves 6 and 11 closed. Meanwhile, the balance of the oil is pumped through line 13 to the dispersion unit 12. The hot concentrate of polyethylene enters line 28 (FIGURE 2) at approximately 230° F. and a back-pressure of about 400 p.s.i.g. The oil enters through conduits 27 and 29 into nozzles 42 and 44 and other associated conduits (not shown) into nozzles 59 and 60 (FIGURE 3) at a temperature of about 80° F. and a 400 p.s.i.g. back-pressure. The pumping rates of the pumps handling the concentrate and diluent oil are adjusted to give the proper ratios of ingredients. The two liquids meet or collide in high velocity streams whereby instantaneous controlled changes in temperature, pressure and concentration occur. The hot solution of polyethylene concentrate is cooled, diluted and worked instantaneously. The resulting grease is a very light colored, No. 1 consistency-grade grease with a dropping point of about 185° F.

Referring to FIGURE 4, the hot concentrate enters via line 71 and fills chamber 74 passing therefrom under high pressure (400 p.s.i.g.) through apertures 72. The cool diluent oil at about 80° F. enters the dispersion unit via line 92 passes up through the grooves 86, 87 and 88 to contact, dilute and cool the incoming concentrate under the tremendous shearing action of the rotor 83. Here again simultaneous cooling, dilution and working take place and a light colored, No. 1 consistency grease is formed.

Numerous other soaps and polymers can be used to make greases by the present method. Any soap, polymer, or other material which exhibits emulsoidal characteristics or which exhibits emulsion-forming tendencies with a particular liquid may be used with that particular liquid to form colloidal dispersions or emulsions as the case may be. Thus the process may be used for making not only many greases but also such compositions as cosmetics, medicinal salves, ointments, salad dressings, etc. Soaps which may be used include all the metal soaps of the fatty acids. Polymers which may be used are any of those exhibiting a limited solubility in a particular liquid, such as polyacrylates, polystyrenes, etc. in mineral oils. Temperature, pressure and concentration must be adjusted to suit the particular system or type of dispersion desired.

From the description so far given of the invention it is seen that the process eliminates the necessity of two cooling steps, one before dilution and other after dilution as generally considered essential in the prior art. Another advantage is that the finished product produced by the present method may be passed directly to packaging from the dispersion unit without passing through a rotator or mill. In addition, the method eliminates the necessity of recycling portions of the concentrate or slurry through a separate shearing operation before dilution. Also, the necessity of quick quenching in conjunction with subsequent shearing, previously thought to be advantageous, need no longer be practiced. Considerable loss in energy and the utilization of extra equipment is necessary to prepare dispersions according to prior art methods requiring separate cooling and shearing, or quenching and shearing, along with recycle of a cool stream of finished product as the quenching medium. The essential feature of rapid heating of the gelling agent or solid phase to solution temperature followed by rapid cooling, characteristic of some prior art processes, is no longer necessary by the practice of the present invention. Consequently, the temperature to which the slurry or concentrate is heated as compared with the temperature of the diluted and worked mixture need not be matters of critical concern since they are subject to direct and easy control by the present process. Likewise, the pressure-drop experienced in the system is within the control of the operator without the need for recycle pumps or plug valves in the system.

The invention has been described by reference to certain preferred embodiments but it is to be understood that these are not to be interpreted as limitations on the scope thereof. Certain changes of the function of the parts may be made without departing from the spirit of the invention. For example, in FIGURE 2 the functions of central conduit 28 and outer conduits 27 and 29 may be reversed, that is, the former may convey the cool diluent and the latter may convey the hot concentrate. The same is true in FIGURE 4 wherein the cooled diluent may enter the apparatus via conduit 71 and the hot concentrate through conduit 92.

This application is a division of application, Serial No. 460,653, filed October 6, 1954, by the instant inventor, now U.S. Patent No. 2,905,448.

What is claimed is:

1. The process for the preparation of emulsoidal dispersions from a solid phase which is dispersible in a liquid phase at an elevated temperature and not dispersible therein at a lower temperature which comprises heating a portion of said liquid phase with said solid phase to form a hot concentrate phase at a temperature higher than said elevated dispersion temperature and subjecting said hot concentrate to simultaneous cooling, dilution, shearing and expansion by injection of said hot concentrate, under a pressure of about 400 to 500 p.s.i.g., into and against a cool stream of the balance of said liquid phase in an expansion zone and separating said emulsoidal dispersion in stable form at a temperature below said elevated temperature without the necessity of milling.

2. The process for the preparation of greases from a gelling agent of the group consisting of metal soaps and polymers having a limited solubility in a liquid oleaginous phase which comprises heating a portion of said liquid oleaginous phase with said gelling agent to form a hot concentrate phase at a solubilizing temperature, subjecting said hot concentrate phase to simultaneous cooling, dilution, shearing and expansion by injection of said hot concentrate at a pressure of about 400 to 500 p.s.i.g. into and against a cool stream of the balance of said liquid oleaginous phase in an expansion zone and separating a stable grease therefrom.

3. The process in accordance with claim 2 in which the temperature of said hot concentrate phase is about 270° to 380° F. and said liquid oleaginous phase is at a temperature of about 80° F.

4. The process in accordance with claim 2 in which said gelling agent is a metal soap.

5. The process in accordance with claim 2 in which said gelling agent is a polymer having a limited solubility in said liquid oleaginous phase.

6. The process in accordance with claim 4 in which said metal soap is a lithium soap.

7. The process in accordance with claim 6 in which said polymer is polyethylene.

8. The process for the pheparation of greases from a gelling agent selected from the group consisting of metal soaps and polymers having a limited solubility in a liquid oleaginous phase which comprises heating a portion of said liquid oleaginous phase with said gelling agent to form a hot concentrate phase at a solubilizing temperature, subjecting said hot concentrate to simultaneous cooling, dilution, shearing and expansion by injection of said hot concentrate and the balance of said liquid oleaginous phase into an expansion zone under conditions whereby both of said streams are subjected to co-mingled centrifugal shearing action at a rotating velocity of about 3600 to 7200 r.p.m. and back pressures of 400 to 500 p.s.i.g. to form a stable grease without the necessity of milling.

9. The process for making grease comprising heating a concentrate of a portion of mineral lubricating oil and soap stock to a temperature of about 175° to 185° F., adding to said concentrate an aqueous solution of a metal base, heating the resulting mixture to a temperature of about 275° to 285° F. for a sufficient time to dehydrate said mixture, further raising the temperature of said dehydrated mixture to about 380° F., injecting said heated dehydrated mixture as a stream into direct contact with a stream of cold mineral oil maintained under a back-pressure of about 400 to 500 pounds per square inch whereby said grease mixture is subjected to simultaneous cooling, working, dilution and expansion and thereafter imediately packaging said grease.

10. The process in accordance with claim 9 in which the metal base is lithium oxide and said soap stock comprises a mixture comprising about 60 percent hydrogenated castor oil and about 40 percent hydrogenated tallow.

11. The process in accordance with claim 9 in which the hot concentrate is formed from about one-third of the total oil to be used in a concentration containing about 11.25 percent of a soap stock.

References Cited in the file of this patent

UNITED STATES PATENTS

| | | |
|---|---|---|
| 1,154,868 | McHenry | Sept. 28, 1915 |
| 1,330,174 | DeCew | Feb. 10, 1920 |
| 1,496,858 | Knollenberg | June 10, 1924 |
| 2,267,412 | Merwin | Dec. 23, 1941 |
| 2,318,668 | Calkins | May 11, 1943 |
| 2,461,276 | Hetherington | Feb. 8, 1949 |

OTHER REFERENCES

The Manufacture and Application of Lubricating Greases, Boner, Reinhold Pub. Corp., N.Y., 1954, page 454.

Emulsion Technology, Chem. Pub. Co., Inc., N.Y., 1946, p. 95.

UNITED STATES PATENT OFFICE
CERTIFICATE OF CORRECTION

Patent No. 3,061,544　　　　　　　　　　　　October 30, 1962

Thomas W. Martinek

It is hereby certified that error appears in the above numbered patent requiring correction and that the said Letters Patent should read as corrected below.

Column 6, line 58, for the claim reference numeral "6" read -- 5 --; line 60, for "pheparation" read -- preparation --

Signed and sealed this 23rd day of April 1963.

(SEAL)
Attest:

ERNEST W. SWIDER
Attesting Officer

DAVID L. LADD
Commissioner of Patents